(12) United States Patent
Pradhan et al.

(10) Patent No.: US 7,339,484 B2
(45) Date of Patent: Mar. 4, 2008

(54) EVENT-DRIVEN DISCOVERY METHOD AND APPARATUS

(75) Inventors: Salil Pradhan, Santa Clara, CA (US); Mehrban Jam, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 765 days.

(21) Appl. No.: 10/185,972

(22) Filed: Jun. 27, 2002

(65) Prior Publication Data

US 2004/0003133 A1    Jan. 1, 2004

(51) Int. Cl.
    *G08B 21/00* (2006.01)
(52) U.S. Cl. .................. 340/635; 455/437; 455/439; 455/553.1; 455/556.2; 340/538.15; 340/539.11; 340/539.22; 340/539.23
(58) Field of Classification Search ................ 719/318, 719/310, 330; 709/223, 224, 227, 228, 245, 709/248–250; 370/465, 441; 455/41.1–41.2, 455/3.01, 3.05, 401, 404.2, 73, 74.1, 434, 455/437, 439; 340/573.1, 636, 635; 701/207
    See application file for complete search history.

(56) References Cited

U.S. PATENT DOCUMENTS

| | | | | |
|---|---|---|---|---|
| 5,603,054 A | * | 2/1997 | Theimer et al. ................ 710/6 |
| 5,734,642 A | * | 3/1998 | Vaishnavi et al. ........... 370/255 |
| 5,767,778 A | * | 6/1998 | Stone et al. ............. 340/636.1 |
| 6,016,476 A | * | 1/2000 | Maes et al. ..................... 705/1 |
| 6,216,158 B1 | * | 4/2001 | Luo et al. .................... 709/217 |
| 6,535,132 B2 | * | 3/2003 | Waters et al. ............. 340/573.1 |
| 6,584,499 B1 | * | 6/2003 | Jantz et al. .................. 709/220 |
| 6,728,632 B2 | * | 4/2004 | Medl .......................... 701/207 |
| 6,760,762 B2 | * | 7/2004 | Pezzutti ...................... 709/223 |
| 6,813,491 B1 | * | 11/2004 | McKinney ............... 455/414.1 |
| 6,842,460 B1 | * | 1/2005 | Olkkonen et al. .......... 370/465 |
| 6,865,371 B2 | * | 3/2005 | Salonidis et al. .......... 455/41.1 |
| 7,042,852 B2 | * | 5/2006 | Hrastar ....................... 370/310 |
| 2003/0110291 A1 | * | 6/2003 | Chen .......................... 709/244 |
| 2003/0125057 A1 | * | 7/2003 | Pesola ........................ 455/502 |
| 2004/0153548 A1 | * | 8/2004 | Latvakoski et al. ......... 709/228 |
| 2004/0203359 A1 | * | 10/2004 | Sasai et al. ................ 455/41.1 |
| 2004/0203746 A1 | * | 10/2004 | Knauerhase et al. ..... 455/432.1 |

OTHER PUBLICATIONS

T. salonidis, et al, "Proximity Awareness and Fast Connection Establishment in Bluetooth", IEEE, 2000, pp. 141-142.*

* cited by examiner

*Primary Examiner*—William Thomson
*Assistant Examiner*—Phuong N Hoang

(57) ABSTRACT

Provided is a method and apparatus for performing discovery between devices in a network. Using event-driven discovery, devices conserve energy resources and more rapidly join a given network. The event-driven discovery detects a common-event associated with a first device preparing to communicate with a second device. The first device then discovers the second device in response to detection of the common-event. For example, this common-event could be a handshake with another person. During discovery, the first and second devices exchange respective information and optionally may establish a communication session to exchange further information if desired.

39 Claims, 5 Drawing Sheets

EVENT-DRIVEN DISCOVERY METHOD AND APPARATUS

BACKGROUND OF THE INVENTION

The present invention relates to device discovery and establishing network communications with the devices.

An increasing number of networks use specially adapted protocols and processes for dynamically configuring and generating a network topography. These networks are sometimes deemed ad-hoc networks as the devices attached to these networks are configured into the network relatively quickly and often just prior to communication. Because of their dynamic nature, the ad-hoc network is well suited to work with mobile devices seeking to quickly enter and communicate over the network. Growth and popularity of these ad-hoc networks has tracked the growth of mobile devices.

In practice, devices in ad-hoc networks periodically discover each other and establish communication connections. These connections remain open while the devices involved in the ad-hoc network exchange a stream of information or anticipate sending additional information. Connections between the devices generally end when the devices leave the network or stop transmitting information for a predetermined time interval. For example, this would occur in a wireless network if a wireless device moves outside the range of the wireless base station or fails to send data over the network during a maximum time-out period.

Unfortunately, there is a high overhead cost associated with discovering and maintaining these networks. A great deal of time and energy is spent performing discovery when devices enter these ad-hoc networks. Discovery requires devices to transmit and receive information for an indeterminate time period prior to performing data transmission with each other over these ad-hoc networks. With the limited power supply in the mobile device, energy spent during the discovery process detracts from the actual communication time available once the devices establish their network connections. Moreover, many connections with devices are maintained unnecessarily in the ad-hoc networks. Mobile devices may spend their energy keeping a network connection established even after they have completed communicating and other devices have left the network.

In general, devices and networks need to better accommodate the characteristics of ad-hoc networks and utilize their resources more efficiently in light of these and other considerations.

DETAILED DESCRIPTION

Ad-hoc networks are generally formed from mobile devices connected together over wireless links in an arbitrary graph. The topology of an ad-hoc networks changes quickly and unpredictably as mobile devices spontaneously leave one ad-hoc network and become part of another. Successful communication in these ad-hoc networks requires the devices to occasionally explore the existence of other devices through a discovery process. During discovery, devices identify other devices interested in communicating and exchange preliminary communication parameters and information necessary to effectuate a communication session.

Implementations of the present invention help a wide-range of device types, both mobile and non-mobile, perform discovery rapidly, efficiently and with lower-energy requirements. Advantages that can be seen in implementations of the invention include one or more of the following. Using a common-event to trigger the discovery process, each device performs discovery on demand rather than continuously as practiced in other designs. In devices with limited power supplies, this increases the communication time available between devices as less energy is used during the discovery process. Performing discovery on demand also reduces unnecessary signal transmission and interference with other devices. Devices performing continuous discovery interfere with other devices attempting discovery or already in a communication session. Implementations of the present invention, however, present less interference in a given geographic proximity thereby allowing more devices to perform discovery and communication.

Figure 1:
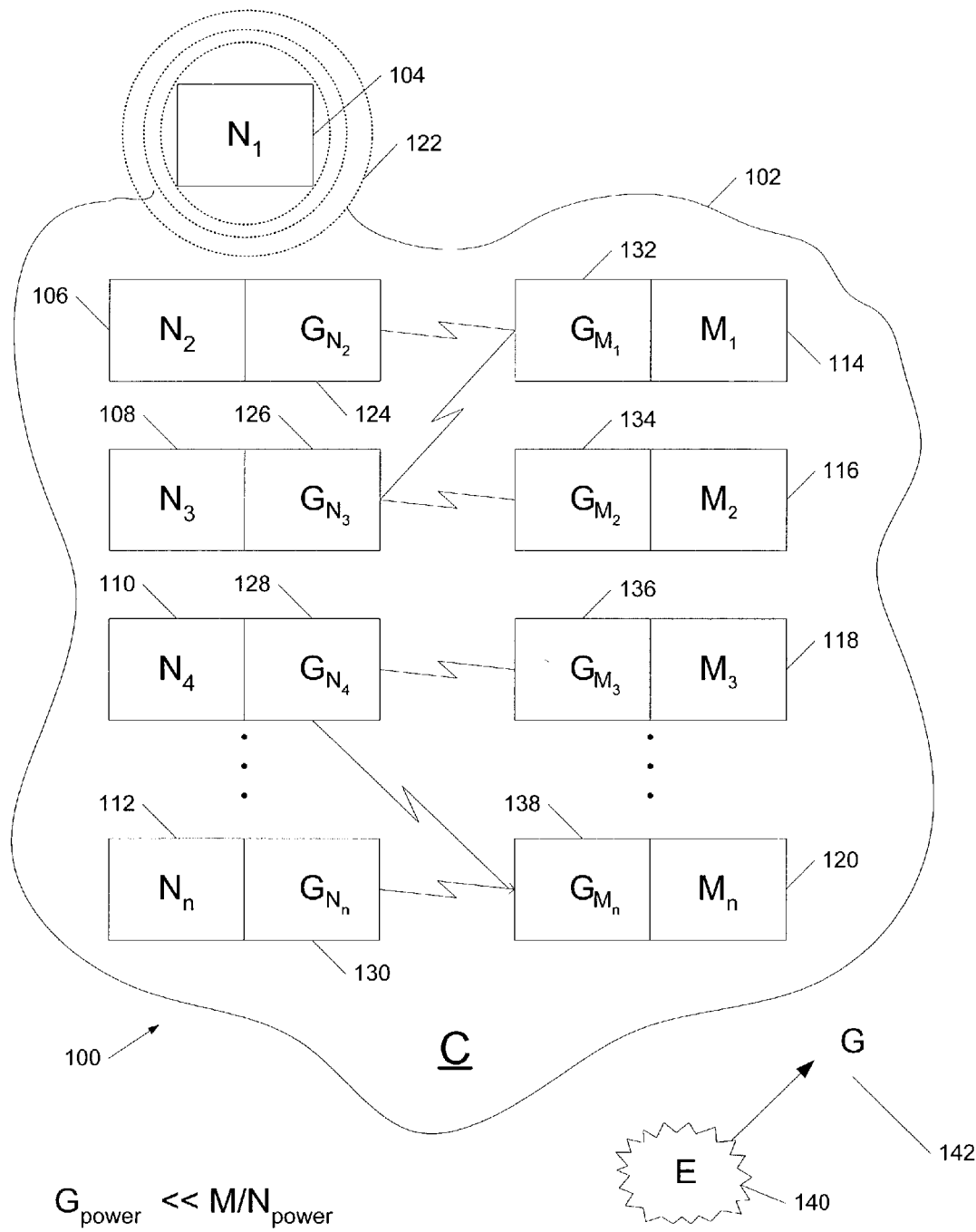
FIG. 1 is a block diagram depicting a number of devices performing event-driven discovery according to one implementation of the present invention.

FIG. 1 is a block diagram depicting a number of devices performing discovery and initiating communication in a geographic proximity 100 according to one implementation of the present invention. Continous device 104 and the set of devices 106, 108, 110 and 112 (hereinafter devices 106-112) corresponding to devices $N_1$ through $N_n$ and devices 114, 116, 118 and 120 (hereinafter devices 114-120) corresponding to devices $M_1$ through $M_n$ operate in a Context (C) 102. Continuous device 104 corresponding to $N_1$ transmits discovery information 122 continuously and does not use implementations of the present invention. For continuous discovery, common-event (E) 140 creates a specific common-event (G) that sensors 124, 126, 128 and 130 (hereinafter sensors 124-130) corresponding to $G_{N2}$, $G_{N3}$, $G_{N4}$ and $G_{Nn}$ and sensors 132, 134, 136 and 138 (hereinafter sensors 132-138) corresponding to $G_{M2}$, $G_{M3}$, $G_{M4}$ and $G_{Mn}$ may detect.

Generally, continuous device 104, devices 106-112 and devices 114-120 are wireless communication devices having a self-contained power supply (e.g., a battery) and optionally may include a chronograph, a personal digital assistant, audio/video player or other additional features or functions. Alternate implementations not having a self-contained power supply yet having low-power or energy conservation consumption requirements could also benefit from implementations of the present invention. In general, implementations of the present invention can be based on direct-current (DC) power sources, alternating-current (AC) power sources or a combination of DC and AC power sources.

Continuous devices 104, devices 106-112 and devices 114-120 operate and communicate in a context 102. Context 102 represents environments suitable for implementing ad-hoc networks using devices designed in accordance with the present invention. For example these environments include: corporate meetings within a company or between companies, conventions, voting or polling events, auctions, social meetings and other environments where devices may be used and discovery needs to occur. Generally, context 102 describes an environment where devices and/or people using devices in context 102 wish to communicate with each other over an ad-hoc network. Often, the people using the devices are familiar with each other and likely to exchange information.

In operation, continuous device 104, devices 106-112 and devices 114-120 are present in context 102 and capable of communicating with other devices as illustrated. Continuous device 104 performs continuous discovery 122 of other devices and can be either inside context 102 or outside context 102. More energy is generally expended by continuous device 104 using continuous discovery 122 to detect and discover other devices compared with devices 106-112 and devices 114-120 that perform discovery in response to common-event 140.

In one implementation, common-event 140 correspond to gesture (G) 142 made by a user with their hand. Sensors 124-130 and sensors 132-138 respond to this gesture causing corresponding devices 106-112 and devices 114-120 to initiate discovery driven by the event. For energy savings, the power expended by sensors 124-130 and sensors 132-138 should be less than the energy spent by the corresponding devices 106-112 and devices 114-120 were they to instead perform continuous discovery ($G_{power} << M/N_{power}$).

FIG. 1 further illustrates that devices can discover and communicate with a single device as well as many different devices within context 102. As indicated in FIG. 1, devices 106-112 are capable of discovering and/or communicating with one or more devices 114-120. For example, device $N_2$ can discover and communicate with device $M_1$ while device $M_1$ can discover and communicate with both device $N_2$ and device $N_3$. The occurrence of common-event 140 determines whether a device discovers and communicates with another device. If common-event 140 occurs, one or more of sensors 124-130 respond and cause the respective devices to discover and potentially communicate with other devices. When common-event 140 does not occur, sensors 124-130 do not respond and devices do not perform discovery of other devices.

Common-event 140 can be any event that causes at least one device in context 102 to perform discovery in accordance with the present invention. Common-event 140 also may be different for each device in context in 102 yet share some common characteristic. For example, a gesture like a handshake from one person can cause a first device to perform discovery while a different gesture or handshake from another person can cause a second device to perform discovery.

Figure 2:
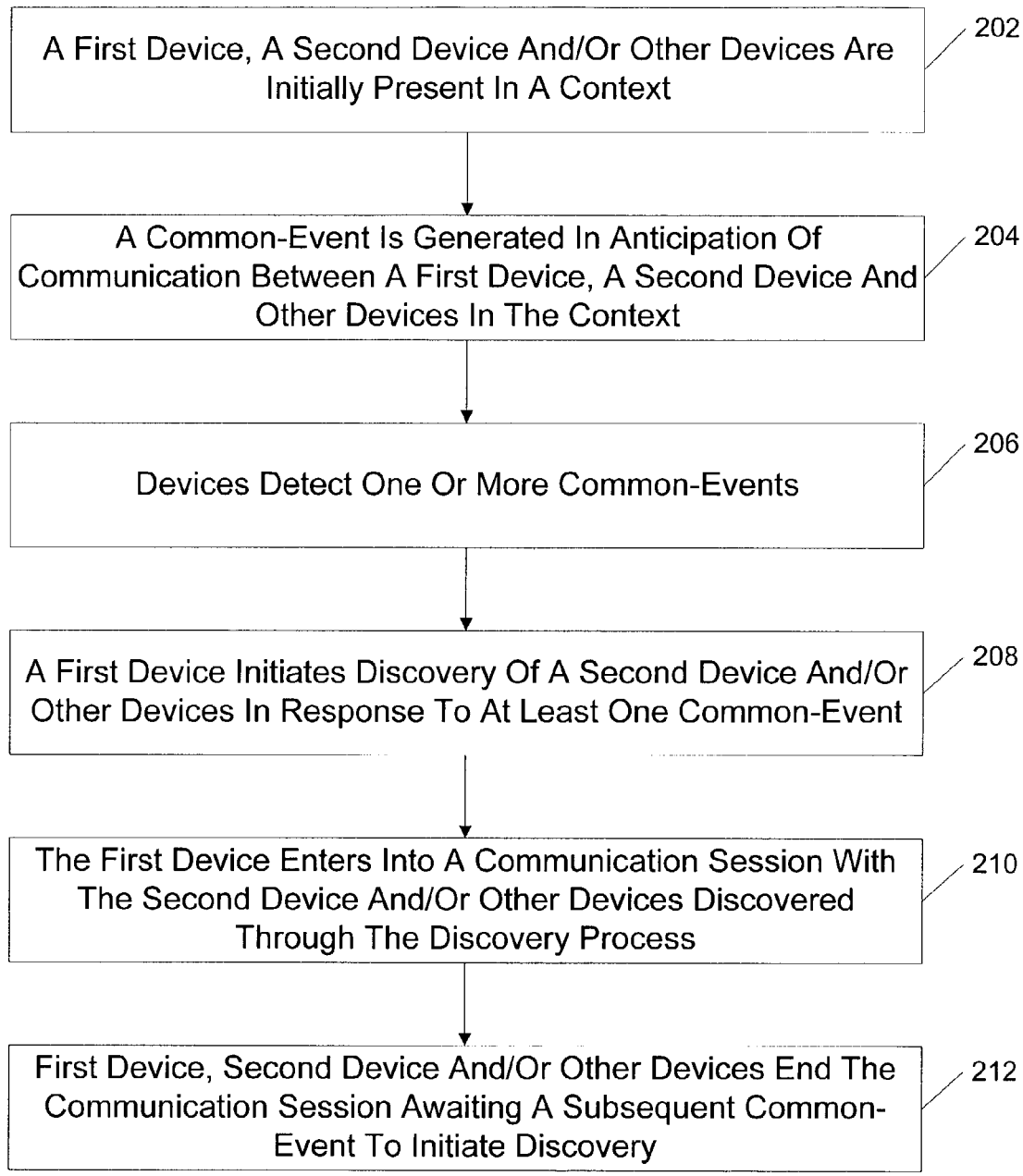
FIG. 2 is a flowchart diagram illustrating the event-driven discovery and communication process between devices in accordance with one implementation of the present invention.

FIG. 2 is a flowchart diagram illustrating the discovery and communication process between devices in accordance with one implementation of the present invention. Accordingly, a first device and a second device initially present in a context 102 have not discovered each other and cannot communicate (202). Devices of the present invention defer discovering other devices until some form of communication with the other devices is requested. By deferring this process until necessary, devices in context 102 have increased energy efficiency in addition to less signal interference as devices broadcast discovery signals on demand rather than continuously. Lower energy is also required because the first device, the second device and other devices and services are in a common zone or context 102 with relatively close physical proximity between the various devices. Energy spent performing discovery can be reduced, in part, because the distance between devices is generally shorter.

Before actual discovery begins, a common-event is generated in anticipation of communicating with a second device or other devices (204). In one implementation, the common-event is triggered to make the first device discover other devices in context 102. For example, the common-events can include a user moving the device in a predetermined manner using a gesture, generating a specific sound or voice request or any other event the first device is capable of detecting. To reduce energy consumption, the first device uses sensors with low-power requirements to detect each of these various common-events.

Alternatively, the common-event can be generated by a third-party operating a machine, another device operating autonomously or any man-made or natural event. For example, the common-event can be a buzzer/starting gun at a sporting event, an auctioneer's voice at an auction, a coherent (e.g., laser) or non-coherent light beam, certain scents or odors, temperatures or pressure or anything else detectable by a sensor on the device.

Further, the second device and other devices in context 102 can perform continuous discovery like continuous device 104 in FIG. 1 or event-driven discovery in response to the common-event previously described. For example, the second device can begin discovery coincident with the first device in response to a common-event like a gunshot, a horn or loud-whistle. Alternatively, the common-event for the first device can be a particular hand-gesture by a first user while the second device detects a hand-gesture from a second-user. The second device could be sensitive to the hand-gesture from the second user because the second device is attached to the second-user's hand; it could also be sensitive to a particular hand-gesture made by the second user because the gesture is unique to the second user and either not known or used by the first user.

Devices in context 102 and designed in accordance with the present invention are capable of detecting one or more common-events (206). Depending on the common-event, devices may include one or more sensors suitable for detecting various combinations of movement, sound, light or images associated with the common-event. For example, accelerometers can be used to detect movement of a first device in response to a gesture like a handshake or hand waving. The first device can also include a biometric measurement device. For example, a miniature fingerprint reader that detects the fingerprint placed on a platen (such as the glass surface of a watch crystal) that then verifies the identity of the user.

Upon detecting the common-event, the first device initiates discovery of a second device or multiple devices in context 102 (208). Discovery typically radiates outwards from the first device to determine the information, services or resources available on the other devices in context 102. Proper discovery allows each device or resource in context 102 to advertise services they provide, locate the services they need, and build and maintain a relationship between devices and needed applications and services.

Once initiated, discovery can take place coincident with the occurrence of the common-event or for a limited time interval starting when the common-event is detected. For example, discovery can occur when a device detects a handshake gesture and end once the handshake gesture ends. Alternatively, the discovery can begin when the handshake gesture is detected and continue for a limited time interval subsequent to the handshake gesture event.

The actual discovery process typically includes several operations and considerations: a description of capabilities, a negotiation of syntax to exchange information about these capabilities and an exchange of the actual capabilities using a particular discovery protocol.

The capability description describes the functions required by the first device and the functions provided by other devices, applications and services. These capability descriptions can be generalized for types of devices or service classes. For example, two mobile devices may carry personal information to be exchanged in addition to storing feature information about the mobile devices. For example, a watch, a small wireless phone or other device attached to a person can be used to provide an electronic business card about the user wearing the watch, phone or other device. A stationary device like a printer can include paper size, print density, color capability, as well as input source, output tray and finishing functions like binding and stapling. Audio equipment can transmit a volume control function having selections for on, off, mute and volume gradient control. Additional audio equipment controls may be described for audio attributes such as tone, balance and fade.

Generally, the syntax for describing the capabilities of a device can be different from other devices and negotiated during the discovery protocol. It is more important that the semantics and consistency of the capability description is complete than it appear in a common format or syntax. For example, a mobile device attempting to discover a color printer that supports stapling and collating will have difficulty locating these resources and functions if the printer description syntax only describes its color capability. Further, mobile devices should also describe the personal information available on each respective user using the mobile device and whether the personal information is available or confidential and unavailable without further permissions.

Finally, the discovery process uses a protocol itself. The discovery protocol consists of the messages sent over a network to devices in context 102. To make discovery work on different devices, the discovery protocol generally is independent of the transmission protocol. This is important for devices discovering and communicating with different device types using different transmission protocols.

For example, a device in context 102 having voice capabilities may communicate with a private branch exchange (PBX) using Bluetooth. The PBX may be in communication with security services via an IEEE 1394/FireWire backbone and the security server attached to the backbone may be communicating with individual security resources via power line transfer. In this example scenario, the device identifies the security resource while passing over three transmission protocols each compatible with the same discovery protocol. Alternatively, an integrated discovery and transmission protocol can be used if the features available with the separate discovery and transmission protocol design are not required.

Additionally, implementing the discovery protocol can include several variations. In one implementation, a first device can use the discovery protocol to request general information from devices or services in context 102. This approach can include a fairly large amount of information as each device could respond with a significant amount of detailed information. Alternatively, the first device could request a service with specific requirements requiring each device to determine if they meet the requirements and then respond. This latter implementation would require other devices to process these requirements and would offload and distribute the processing from only the first device to multiple devices in context 102.

Yet another implementation could involve an intermediary service directory to initially contact devices and services in context 102 and register information regarding the various capabilities. In this latter implementation, each device would initially register with the intermediary service directory upon entering context 102. A first device would direct discovery requests for other devices in context 102 on demand to the intermediary service directory rather than directly to the other devices. If the intermediary service directory performs the comparison, this approach might increase the complexity of the network in context 102 while off-loading the compare function from other devices and services in context 102. In many situations, a combination of these various discovery methods can be used rather than a single approach.

Referring to FIG. 2, the first device enters into communication with other devices once they are discovered through the discovery process (210). The communications between devices can be short or long communications involving various lengths and types of data. TCP/IP is one communication protocol used by one implementation of the present invention for devices performing data communication. These devices continue the communication until they have either completed the transmissions or one of the devices in the communication session terminates the transmission of data. Upon completion, the devices end the communication session and wait for another common-event to initiate the discovery process and subsequent communications (212).

Figure 3:
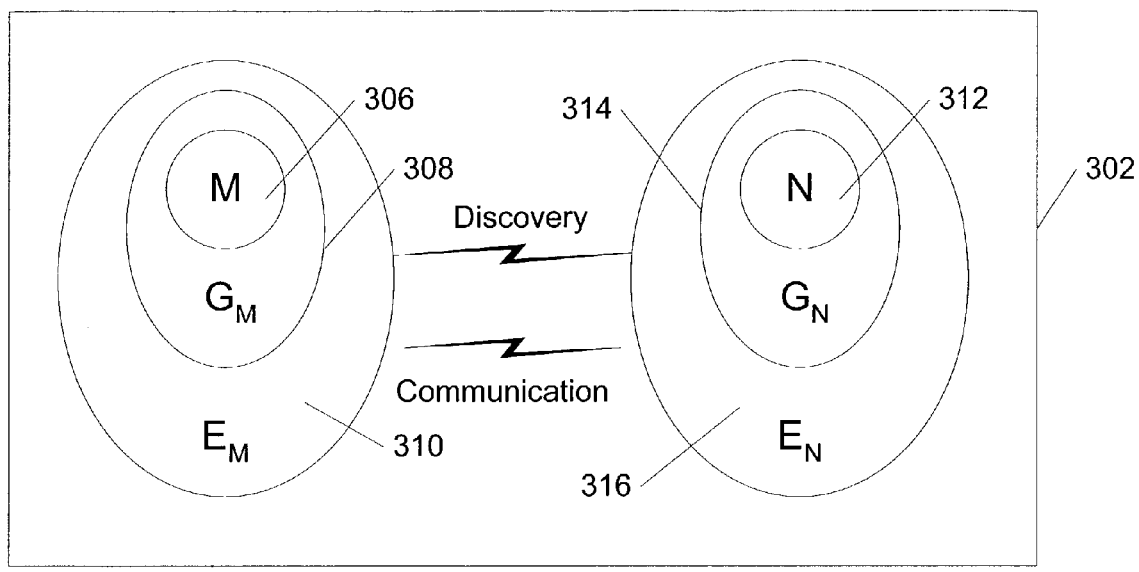
FIG. 3 is a block diagram illustrating example relationships between devices performing event-driven discovery designed in accordance with one or more implementations of the present invention.
Figure 3:
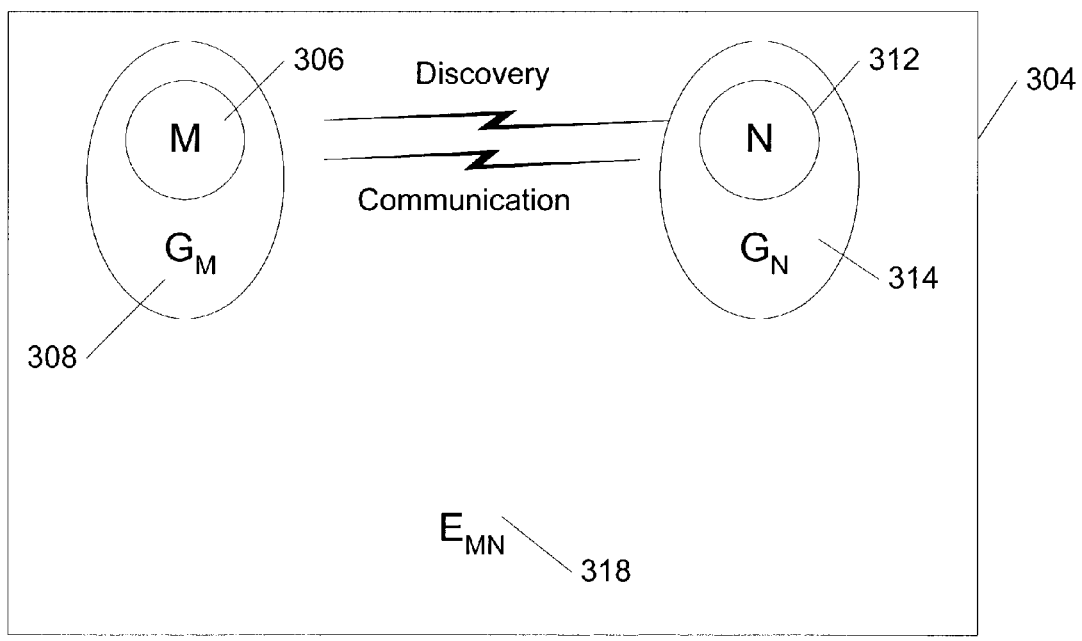

FIG. 3 is a block diagram illustrating example relationships between devices performing event-driven discovery and communication in accordance with implementations of the present invention. A peer-to-peer arrangement 302 allows devices to discover and communicate directly while a master-slave arrangement 304 is used for devices driven by an external event. Alternate implementations include combinations of peer-to-peer arrangements, master-slave arrangements and other arrangements for performing event-driven discovery and communication.

Peer-to-peer arrangement 302 includes a device (M) 306 having a corresponding sensor ($G_M$) 308 responsive to a common-event ($E_M$) 310 that discovers and communicates with device 312 (N) having a corresponding sensor ($G_N$) 314 and responsive to a common-event 316. In this implementation, sensor 308 detects common-event 310 causing device 306 to perform discovery of device 312 or other devices in the proximity. Sensor 308 is designed to detect common-event 310 associated with the user of device 306 and includes a gesture, a voice, a sound, a scent, pressure, temperature or any other event sensor 308 can be constructed and configured to detect.

Further, sensor 308 can be trained to detect unique aspects of common-event 310 including biometric measurements associated with a user or other specific measurements. For example, this could include a user's specific voice pattern, a specific temperature measurement or any other detectable event associated with the user. Device 312 operates similarly in discovering device 306 and other devices in the proximity with the exception that sensor 314 detects common-event 316 causing device 312 to begin discovery. Once device 306 and device 312 discover each other, they may begin communicating and exchanging information. This peer-to-peer arrangement 302 could be used when a small number of devices want to individually perform discovery and enter an ad-hoc network with other devices.

Master-slave arrangement 304 includes device (M) 306 having sensor ($G_M$) 308 and device 312 (N) having sensor ($G_N$) 314 both responsive to a common-event ($E_{MN}$) 318. This common-event 318 causes these devices to initiate discovery and potentially begin communication with each other and potentially with other devices in the proximity. Because device 306 and device 312 initiate discovery at approximately the same time interval, they may be more likely to succeed at discovery and communication.

In practice, master-slave arrangement 302 could be used to coordinate the rapid discovery and formation of a larger ad-hoc network. Using a common-event 318 to trigger the discovery conserves energy spent by each device for discovery while creating the ad-hoc network. Instead of multiple discoveries, a device entering the ad-hoc network may need to use one or just a few discovery sessions initiated by common-event 318 to discover many other devices. The common-event 318 for initiating this type of discovery includes whistles or gunshots at the start of an event, the opening bell of an auction and other events useful to create large ad-hoc networks.

Figure 4:
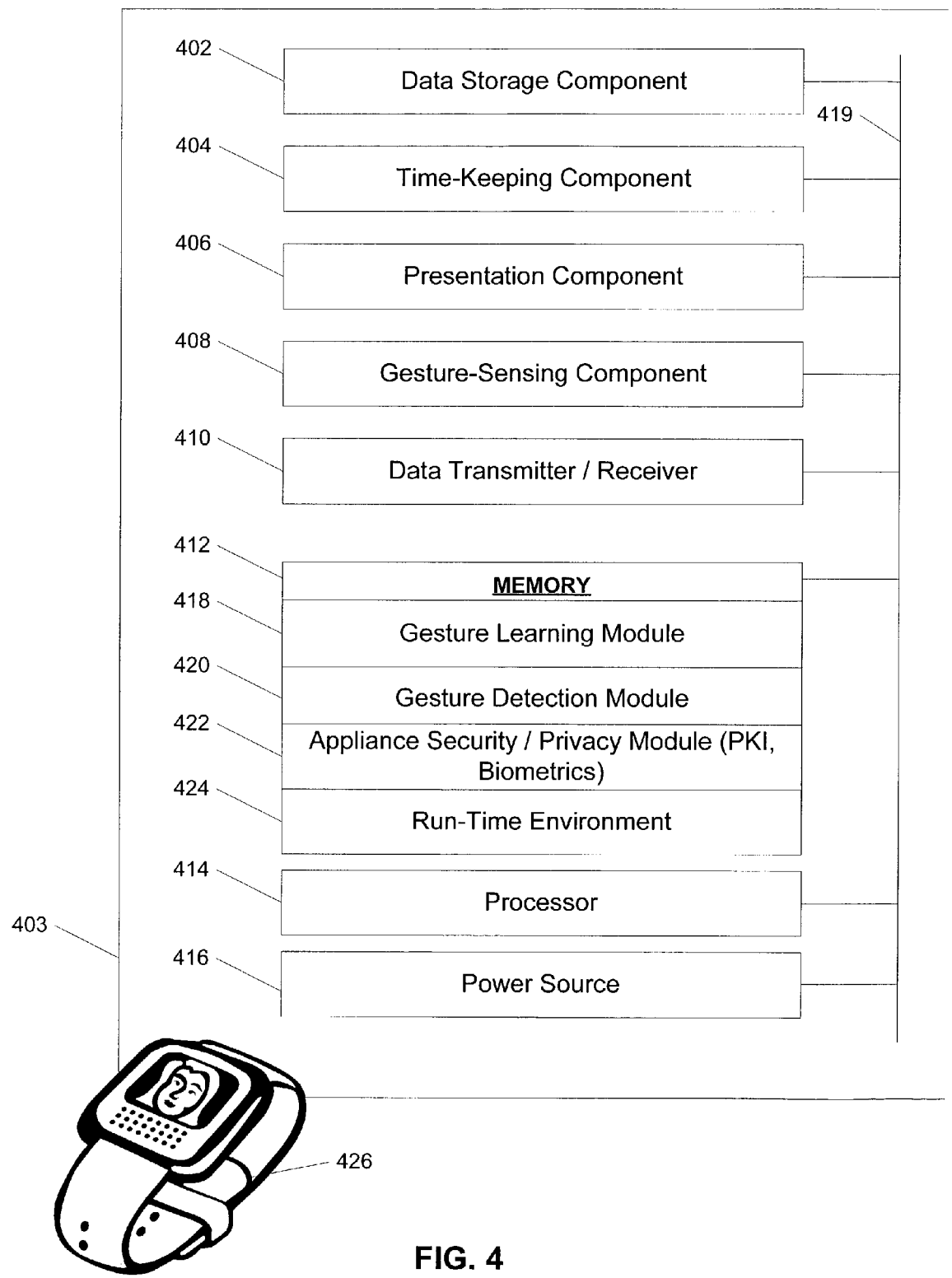
FIG. 4 is a block diagram representation of a watch device designed to perform event-driven discovery in accordance with the present invention.

FIG. 4 is a block diagram representation of a device that performs event-driven discovery in accordance with the present invention. In this implementation, the device is a watch 426 that a user wears and initiates discovery during a handshake or other gesture in accordance with implementations of the present invention. In this implementation of the present invention, watch 426 includes a data storage component 402, a time-keeping component 404, a presentation component 406, a gesture-sensing component 408, a data transmitter/receiver component (transceiver) 410, a memory component 412, a processor component 414 and a power source 416 operatively coupled together over bus 419.

Data storage component 402 stores data and applications that use ad-hoc networks. Applications in data storage component 402 access other devices over an ad-hoc network obtaining business information, personal information and other information made available by other devices on the ad-hoc network. Applications may include various types of client-server applications and peer-to-peer applications that exchange information. For example, this could include a file swapping services for photos, audio, video and other multimedia content.

Time-keeping component 404 includes hardware and software for keeping track of time and timing of events on watch 426. This time-keeping component 404 can track time of day in one or more time-zones, operate a chronograph for measuring events and also be used in timing certain aspects of event-driven discovery implementations of the present invention.

Presentation component 406 provides an interface for operating all the functions of watch 426 including options associated with the event-driven discovery aspects of the present invention. For example, a user can access presentation component 406 to set discovery options on watch 426 to occur either continuously or in an event-driven manner consistent with the present invention. Also, presentation component 406 can be used to indicate the successful or unsuccessful discovery of devices during the event-driven discovery process.

Gesture-sensing component 408 includes components for sensing handshaking or other gestures in watch 426 that trigger event-driven discovery implementations of the present invention. In one implementation, these gesture-sensing components 408 include low-power consumption accelerometers capable of detecting handshakes and other gestures as needed to operate implementations of the present invention. These accelerometers can be developed using Micro Electro Mechanical Systems or MEMS technology.

Alternate implementations include different sensing components depending on the common-event type used to trigger the discovery process in watch 426 or other device. For example, a device using a sensor sensitive to certain non-coherent or coherent lights may be devised from charge-coupled devices (CCDs) other light sensors capable of detecting light in the corresponding spectrum.

Data transmitter/receiver component 410 is used to transmit and receive information respectively once watch 426 discovers and enters the ad-hoc network. The data transmitter/receiver component 410 can use infra-red over an IrDA ports or radio-frequency communication over Bluetooth, WIFI/802.11b or other wireless communication protocols like AMPS, CDMA, GSM or TDMA.

Memory component 412 includes at least the modules necessary for performing event-driven discovery. In one implementation, these modules in memory 412 include a gesture learning module 418, a gesture detection module 420, an appliance security/privacy module using public key infrastructure (PKI) with biometrics and a run-time environment 424. Run-time environment 424 schedules the processing of these and other modules in memory 412 and generally controls allocation of resources on watch 426.

Gesture learning module 418 can be calibrated to detect a predetermined gesture or handshake or alternatively can be designed to learn a specific gesture associated with the user of watch 426. Gesture detection module 420 compliments gesture learning module 418 and detects a gesture for a particular user or matches the predetermined gesture or handshake initially provided with watch 416.

Security/privacy module 422 includes components for exchanging information securely and ensuring the accurate identification of parties exchanging the information. This includes using Public Key Infrastructure (PKI) for data exchange as well as the possibility of using biometric measurements for identification purposes. For example, the crystal of watch 426 combined with a coherent light-source can be used as a platen to receive thumbprints from a user. In the case of watch 426, appliance security module 422 also includes an authentication procedure for a user to attach the device to their wrist and authenticate their identity. Appliance security module 422 also includes a procedure that invalidates the authenticity of a user's identity once watch 426 attached to their wrist is removed.

Processor component 414 executes instructions and processes information on watch 426 supplied with power from power source 416. This processor can be a general-purpose processor or a more specialized embedded processor. Power source 416 is generally a battery or fuel cell providing power to watch 426 or other mobile device. The average life of power source 416 is extended using implementations of the present invention, as discovery is event-driven and not performed continuously. While FIG. 4 describes watch 426, alternate implementations of the present invention can use fewer or greater components than illustrated in FIG. 4 as needed by personal device assistants (PDA), mobile phones and other devices.

Figure 5:
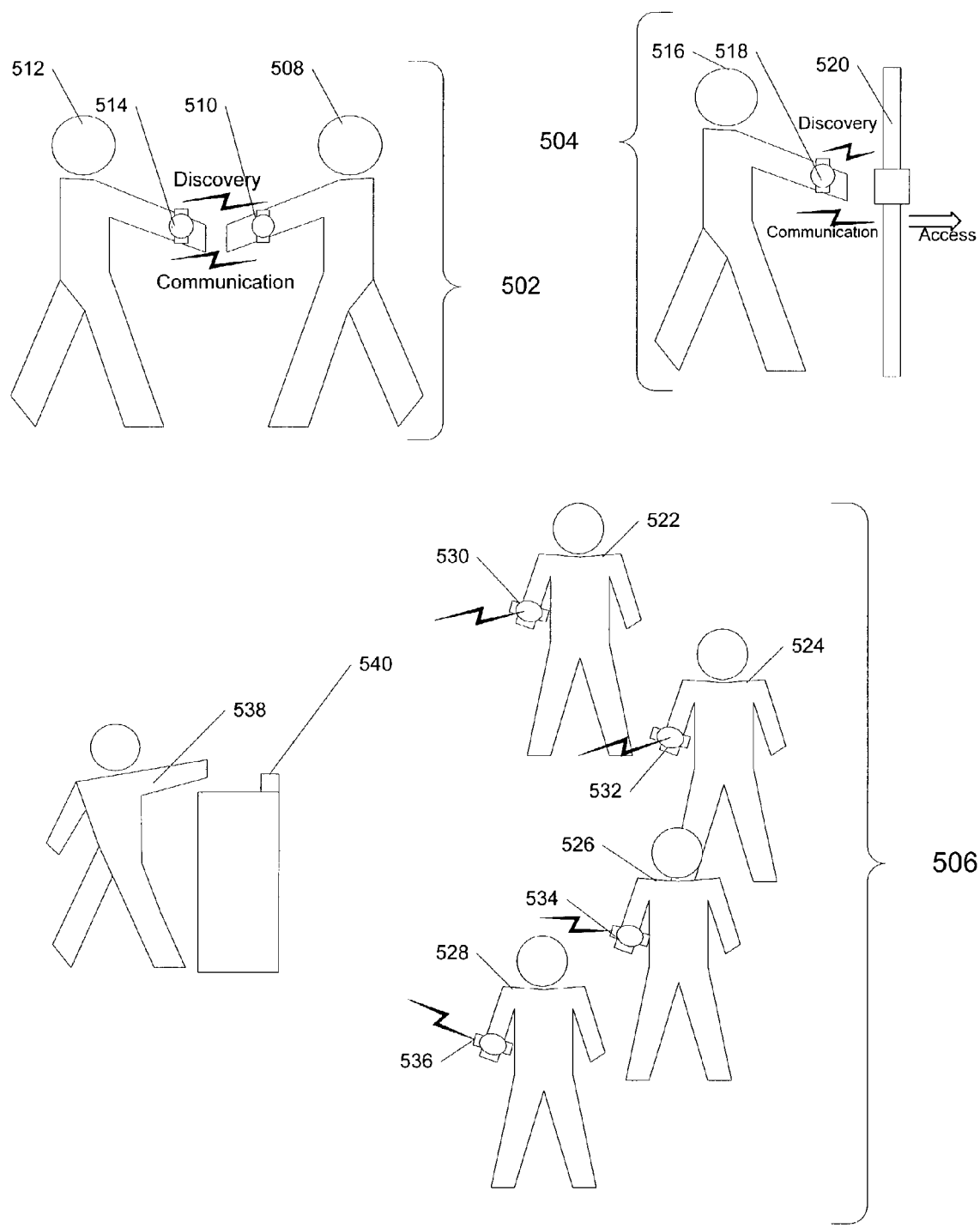
FIG. 5 illustrates several different network scenarios using event-driven discovery and watch devices designed in accordance with one or more implementations of the present invention.

FIG. 5 illustrates several different scenarios for a watch device using event-driven discovery designed according to one implementation of the present invention. These several examples include a person-to-person scenario 502, a person-to-device scenario 504 and a multiple-device scenario 506.

In person-to-person scenario 502, a first person 508 has a watch device 510 and a second person 512 has a watch device 514. The discovery process is initiated on both watch device 510 and watch device 514 when first person 508 and second person 512 engage in handshaking or other gestures. The handshaking or gestures trigger sensors with accelerometers in watch device 510 and watch device 514 respectively initiating a discovery process in each watch device.

Person-to-device scenario 504 involves a person 516 wearing watch device 518 and approaching a door 520 or other secured area having yet another device configured to perform discovery in accordance with the present invention. Person 516 rotates a handle on door 520 or performs another gesture initiating discovery on watch device 518. Rotating the doorknob on door 520 also causes the device (not shown) associated with door 520 to discover watch device 518 and potentially other devices in the vicinity in accordance with the present invention. Subsequent to the discovery, watch device 518 identifiers person 516 and transmits the identity information to the device associated with door 520 thus providing access through door 520. In addition to accessing door 520, implementations of the present invention can be used for many other situations requiring secure access.

Multiple-device scenario 506 includes devices 530, 532, 534 and 536 associated respectively with people 522, 524, 526, and 528 in a proximate area. A third-party 538 operates an external device 540 that generates an event causing each of the devices 530, 532, 534 and 536 to initiate discovery of devices in the proximate area and begin subsequent communication. Devices 530, 532, 534 and 536 conserve energy because they initiate discovery on demand and not continuously. Also, these devices 530, 532, 534 and 536 can participate in more controlled ad-hoc networks. For example, multiple-device scenario 506 can be used for the controlled creation of ad-hoc networks for people participating in auctions, voting or other events. Also, devices attached to objects and used to perform occasional inventory management over a period of time.

Aspects of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output.

Further implementations of the invention can be created using one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

While specific embodiments have been described herein for purposes of illustration, various modifications may be made without departing from the spirit and scope of the invention. Accordingly, the invention is not limited to the above-described implementations, but instead is defined by the appended claims in light of their full scope of equivalents.

What is claimed is:

1. A discovery method to discover devices in a close physical proximity for facilitating communication between the devices in an ad-hoc network, comprising:
   detecting a characteristic of a common-event associated with a first device in the ad-hoc network preparing to communicate with a second device in close physical proximity to the first device, wherein the characteristic of the common-event is based on the relationship to a user, wherein the common event is a single event detected by a sensor for the first device and is also detectable by a sensor for the second device;
   initiating discovery of the second device by the first device responsive to detection of the common-event associated with the first device, wherein discovery includes
      sending a discovery signal from the first device to any devices within range of the first device;
      receiving a description of capabilities of the second device at the first device in response to the sensor for the second device also detecting the characteristic of the common event and the second device receiving the discovery signal; and
   the first device communicating with the discovered second device if the second device discovered the first device.

2. The method of claim 1 further comprising, establishing a communication session between the first device and the second device.

3. The method of claim 1 wherein the first device end second device are in a physical proximity.

4. The method of claim 1 wherein detecting the common-event establishes a time interval for performing discovery.

5. The method of claim 1 wherein the second device initiates a discovery of the first device in response to detecting a common-event associated with the second device.

6. The method of claim 5 wherein occurrence of the common event associated with the first device is external to the second device.

7. The method of claim 1 wherein the second device initiates the discovery of the first device in response to the detection of the characteristic of the common-event associated with the first device.

8. The method of claim 1, wherein the common-event corresponds to a hand-gesture.

9. The method of claim 1 wherein the common-event is generated external to the first device.

10. The method of claim 1 wherein a user of the first device generates the common-event that is detected by the first device and the second device.

11. The method of claim 1 wherein a machine generates the common-event.

12. The method of claim 1 wherein the detected characteristic of the common event comprises one or more of movement, sound, scent, temperature, pressure and light-emission.

13. The method of claim 1 wherein the first device is also capable of performing discovery continuously.

14. The method of claim 1 further comprising identifying the user of the first device according to one or more biometric measurements.

15. The method of claim 14 wherein the biometric measurements include a fingerprint taken from a platen associated with the first device.

16. The method of claim 1 wherein the discovery exechanges information about the devices involved in the communication.

17. The method of claim 15, wherein the information about the devices further includes information on a printer device capacity and capability.

18. A discovery apparatus operable to discover devices in a close physical proximity to facilitate detection of devices in an ad-hoc network network, comprising:
sensor means for detecting a characteristic of a common-event at a first device in the ad-hoc network, wherein the characteristic of the common-event is based on the relationship to a user, wherein the common event is a single event detectable by the sensor means for the first device and is also detectable by a sensor means for a second device in close physical proximity to the first device;
means for the first device to initiate discovery of the second device responsive to the detection of the common-event by sending a discovery signal from the first device to any devices within range of the first device;
means for both the first and second device to exchange respective information during the discovery, including capabilities of each device, if the sensor means for the second device also detected the characteristic of the common event; and
means for establishing a communication session between the first device and the second device.

19. The apparatus of claim 18 further comprising a means for establishing a time interval for performing discovery based on the timing of the common-event.

20. The apparatus of claim 18 further comprising a means external to the first device and the second device that generates the common-event.

21. The apparatus of claim 18 further comprising a means associated with the first device for detecting the characteristic of the common-event.

22. The apparatus of claim 18 further comprising a means associated with the second device for detecting the characteristic of the common-event.

23. The apparatus of claim 18 further a means for detecting a common-event corresponding to a hand-gesture.

24. The apparatus of claim 18 wherein a machine generates the common event.

25. The apparatus of claim 18 wherein a person generates the common-event.

26. The apparatus of claim 18 further comprising a means for detecting one or more characteristics of the common-event selected from a set of characteristics including, movement, sound, scent, temperature, pressure and light-emission.

27. The apparatus of claim 18 wherein the first device further includes a means for performing discovery continuously.

28. The apparatus of claim 18 wherein the first device further includes a means for identifying the user of the first device according to one or more biometric measurements.

29. An apparatus for discovering devices in a network, comprising:
a sensor component capable of detecting a characteristic of a common-event and initiating a discovery of devices in a network responsive to the common-event, wherein the characteristic of the common-event is based on the relationship to a user, wherein the common event is a single event that is also detectable by a second sensor component of a second device;
a transceiver component capable of processing a discovery protocol for discovering other devices if the sensor component detected the characteristic of the common event and is further capable of communicating with the second device if the second sensor component for the second device detected the characteristic of the common event;
a power source component that provides energy to operate the apparatus; and a processor that processes operations associated with discovering devices in a network.

30. The apparatus of claim 29 further wherein the sensor component is capable of detecting one or more characteristics of the common-event including a handshake, movement, sound, scent temperature, pressure and light-emission.

31. The apparatus of claim 29 wherein the sensor component includes accelerometers that detect movement.

32. The apparatus of claim 29 further comprising a data storage component holding one or more applications that utilize the network to process information.

33. The apparatus of claim 32 wherein the application exchanges personal information about a user.

34. The apparatus of claim 32 wherein the application is a file-swapping service for multimedia content.

35. The apparatus of claim 29 wherein the transceiver component is further capable of processing a data communication protocol for communicating with other devices.

36. The apparatus of claim 35 wherein the data communication protocol is compatible with TCP/IP.

37. The apparatus of claim 35 wherein the data communication protocol and the discovery protocol are integrated together.

38. The apparatus of claim 29 wherein the power source component is based on direct-current (DC).

39. The apparatus of claim 29 wherein the power source component uses alternating-current (AC).

* * * * *

UNITED STATES PATENT AND TRADEMARK OFFICE
CERTIFICATE OF CORRECTION

PATENT NO. : 7,339,484 B2  Page 1 of 1
APPLICATION NO. : 10/185972
DATED : March 4, 2008
INVENTOR(S) : Salil Pradhan et al.

It is certified that error appears in the above-identified patent and that said Letters Patent is hereby corrected as shown below:

In column 10, line 46, in Claim 3, delete "end" and insert -- and --, therefor.

In column 11, line 16, in Claim 16, delete "exechanges" and insert -- exchanges --, therefor.

In column 11, line 23, in Claim 18, after "ad-hoc network" delete "network".

Signed and Sealed this

Thirtieth Day of June, 2009

JOHN DOLL
*Acting Director of the United States Patent and Trademark Office*